US012657785B2

(12) United States Patent
Atsmon et al.

(10) Patent No.: US 12,657,785 B2
(45) Date of Patent: Jun. 16, 2026

(54) GENERATING SYNTHETIC SENSOR POINT-CLOUD DATA WITH ROLLING SHUTTER SIMULATION

(71) Applicant: Cognata Ltd., Rehovot (IL)

(72) Inventors: Dan Atsmon, Rehovot (IL); Guy Goldner, Rehovot (IL); Ilan Tsafrir, Shoham (IL)

(73) Assignee: Cognata Ltd., Rehovot (IL)

( * ) Notice: Subject to any disclaimer, the term of this patent is extended or adjusted under 35 U.S.C. 154(b) by 203 days.

(21) Appl. No.: 18/429,533

(22) Filed: Feb. 1, 2024

(65) Prior Publication Data

US 2024/0257410 A1 Aug. 1, 2024

Related U.S. Application Data

(60) Provisional application No. 63/442,497, filed on Feb. 1, 2023.

(51) Int. Cl.
*G06T 11/10* (2026.01)
*B60W 50/00* (2006.01)
*G01S 17/89* (2020.01)

(52) U.S. Cl.
CPC ............. *G06T 11/10* (2026.01); *B60W 50/00* (2013.01); *G01S 17/89* (2013.01)

(58) Field of Classification Search
CPC ....... G06T 11/001; B60W 50/00; G01S 17/89
See application file for complete search history.

(56) References Cited

U.S. PATENT DOCUMENTS

2023/0135234 A1* 5/2023 Wang ................... G06V 10/774
382/103

* cited by examiner

*Primary Examiner* — Xiao M Wu
*Assistant Examiner* — Ryan Allen Barham

(57) ABSTRACT

A system for generating synthetic data, comprising at least one processing circuitry adapted for: computing a sequence of partial simulation images, where each of the sequence of partial simulation images is associated with an estimated simulation time and with part of a simulated environment at the respective estimated simulation time thereof; computing at least one simulated point-cloud, each simulating a point-cloud captured in a capture interval by a sensor operated in a scanning pattern from an environment equivalent to a simulated environment, by applying to each partial simulation image of the sequence of partial simulation images a capture mask computed according to the scanning pattern and a relation between the capture interval and an estimated simulation time associated with the partial simulation image; and providing the at least one simulated point-cloud to a training engine to train a perception system comprising the sensor.

18 Claims, 9 Drawing Sheets

100

100

300

400

401
Compute one or more capture masks

405
Compute a sequence of partial simulation images

410
Apply one or more capture masks

415
Compute one or more simulated sensor point-clouds

420
Provide the one or more simulated sensor point-clouds

600

601
Identify a minimum time difference

610
Select primary projection

611
Select secondary projection

620
Identify one or more blank projected pixels in the primary projection

625
Update the one or more blank projected pixels

700

701
Identify sub-sequence of partial simulation images

710
Associate with a capture mask

720
Compute a plurality of temporal fragment point-clouds

730
Combine

GENERATING SYNTHETIC SENSOR POINT-CLOUD DATA WITH ROLLING SHUTTER SIMULATION

RELATED APPLICATION

This application claims the benefit of priority under 35 USC § 119(e) of U.S. Provisional Patent Application No. 63/442,497 filed on Feb. 1, 2023, the contents of which are incorporated by reference as if fully set forth herein in their entirety.

FILED AND BACKGROUND OF THE INVENTION

Some embodiments described in the present disclosure relate to simulated data and, more specifically, but not exclusively, to simulated sensory data for autonomous driving systems.

As used herewithin, the term "perception system" means a computerized system that makes use of one or more sources of sensory data, i.e. data captured by one or more sensors. More specifically, but not exclusively, the term sensory data refers to data captured by one or more electromagnetic sensors, for example a camera, an electromagnetic radiation sensor, a microphone, a video camera, a rolling shutter camera, a radio detection and ranging sensor (radar) and a laser imaging, detection, and ranging sensor (LIDAR).

As used herewithin, the term "point-cloud" means a set of captured values, captured in an interval of time by a sensor operating in an environment. The term "simulated point-cloud" means a set of simulated values, simulating the point-cloud captured by the sensor.

Some sensors, for example a digital camera, capture the set of captured data points of a point-cloud simultaneously, all at once. Some other sensors, for example a LIDAR, capture the set of captured data points incrementally during an interval of time, known as a capture interval, such that some of the captured data points in the point-cloud are captured earlier than some other captured data points in the point-cloud. This is also known as a rolling shutter.

As the use of perception systems increases, so does the need for data for training perceptions systems. Some perception systems are trained using synthetically generated simulated environments. For such a simulated environment, there is a need to generate synthetic data simulating one or more sensor point-clouds captured by a sensor operating in an environment equivalent to the simulated environment.

SUMMARY OF THE INVENTION

It is an object of some embodiments described in the present disclosure to provide a system and a method for generating synthetic data, simulating data captured in a capture interval by a sensor operating in an environment equivalent to a simulated environment, by using a sequence of computed partial simulation images and applying to each of the sequence of computed partial simulation images one of a plurality of capture masks, each associated with a sampling time in the capture interval. Computing a sequence of partial simulation images requires fewer computing resources than increasing the simulation environment's simulation rate. Increasing an amount of simulation images used to generate a simulated sensor point-cloud increases the accuracy of the simulated sensor point-cloud. Using the sequence of partial simulation images allows increasing accuracy of the simulated sensor point-cloud in a more cost effective manner than increasing the simulation environment's simulation rate.

The foregoing and other objects are achieved by the features of the independent claims. Further implementation forms are apparent from the dependent claims, the description and the figures.

According to a first aspect, a system for generating synthetic data comprises at least one processing circuitry adapted for: computing a sequence of partial simulation images, where each of the sequence of partial simulation images is associated with an estimated simulation time and with part of a simulated environment at the respective estimated simulation time thereof; computing at least one simulated sensor point-cloud, each simulated sensor point-cloud simulating a sensor point-cloud captured in a capture interval by a sensor operated in a scanning pattern from an environment equivalent to a simulated environment, where the scanning pattern describes a temporal distribution in the capture interval of a plurality of captured data points of the sensor point-cloud, by applying to each partial simulation image of the sequence of partial simulation images a capture mask computed according to the scanning pattern and a relation between the capture interval and an estimated simulation time associated with the partial simulation image; and providing the at least one simulated sensor point-cloud to at least one training engine to train a perception system comprising the sensor.

According to a second aspect, a method for generating synthetic data comprises: computing a sequence of partial simulation images, where each of the sequence of partial simulation images is associated with an estimated simulation time and with part of a simulated environment at the respective estimated simulation time thereof; computing at least one simulated point-cloud, each simulated point-cloud simulating a point-cloud captured in a capture interval by a sensor operated in a scanning pattern from an environment equivalent to a simulated environment, where the scanning pattern describes a temporal distribution in the capture interval of a plurality of captured data points of the point-cloud, by applying to each partial simulation image of the sequence of partial simulation images a capture mask computed according to the scanning pattern and a relation between the capture interval and an estimated simulation time associated with the partial simulation image; and providing the at least one simulated point-cloud to at least one training engine to train a perception system comprising the sensor.

According to a third aspect, a system for training a perception system comprising a sensor comprises at least one processing circuitry adapted for: accessing at least one simulated point-cloud produced by: computing a sequence of partial simulation images, where each of the sequence of partial simulation images is associated with an estimated simulation time and with part of a simulated environment at the respective estimated simulation time thereof; computing at least one simulated point-cloud, each simulated point-cloud simulating a point-cloud captured in a capture interval by a sensor operated in a scanning pattern from an environment equivalent to a simulated environment, where the scanning pattern describes a temporal distribution in the capture interval of a plurality of captured data points of the point-cloud, by applying to each partial simulation image of the sequence of partial simulation images a capture mask computed according to the scanning pattern and a relation between the capture interval and an estimated simulation time associated with the partial simulation image; and providing the at least one simulated point-cloud to at least one training engine to train the perception system; and providing the at least one simulated point-cloud to at least one perception model of the perception system.

With reference to the first and second aspects, in a first possible implementation of the first and second aspects computing the at least one simulated sensor point-cloud comprises computing a plurality of capture masks, one for each estimated simulation time of one of the sequence of partial simulation images, and computed according to the scanning pattern and a relation between the capture interval and the respective estimated simulation time. Optionally, computing a simulated sensor point-cloud of the at least one simulated sensor point-cloud further comprises: identifying in the sequence of partial simulation images a sub-sequence of partial simulation images according to the capture interval of the simulated sensor point-cloud; associating each of the sub-sequence of partial simulation images with one of the plurality of capture masks according to the respective relation between the capture interval and the respective estimated simulation time associated with the partial simulation image; computing a plurality of simulated temporal fragment point-clouds, each for one of the sub-sequence of partial simulation images, by applying to each one partial simulation image of the sequence of partial simulation images the capture mask of the plurality of capture masks associated therewith; and combining the plurality of simulated temporal fragment point-clouds to produce the simulated sensor point-cloud. Using multiple capture masks where each is computed according to the scanning pattern and a relation between the capture interval and the respective estimated simulation time increases accuracy of points extracted from each of the sequence of partial simulation images that contribute to the at least one simulated sensor point-cloud, increasing accuracy of the at least one simulated sensor point-cloud. In addition, using a capture mask computed according to the scanning pattern and a relation between the capture interval and the respective estimated simulation time reduces an amount of points extracted from each of the sequence of partial simulation images, thus reducing an amount of computation resources needed to computed the at least one simulated sensor point-cloud compared to applying a common capture mask to all partial simulation images in the sequence.

With reference to the first and second aspects, in a third possible implementation of the first and second aspects each simulation image of the sequence of simulation images describes a ground truth of the simulated environment at the respective simulation time thereof. Using a ground truth produces a simulated sensor point-cloud more accurate than another simulated sensor point-cloud using simulation information that does not include a ground truth of the simulated environment, for example when a real sensor is affected by whether conditions.

With reference to the first and second aspects, in a third possible implementation of the first and second aspects each simulation image of the sequence of simulation images describes a ground truth of the simulated environment at the respective simulation time thereof. Using a ground truth produces a simulated sensor point-cloud more accurate than another simulated sensor point-cloud using simulation information that does not include a ground truth of the simulated environment, for example when a real sensor is effected by whether conditions.

With reference to the first and second aspects, in a fourth possible implementation of the first and second aspects computing the sequence of partial simulation images comprises for each two consecutive simulation images of the sequence of simulation images having a first simulation image and a second simulation image: identifying a sequence of sampling times in a simulation interval between a first simulation time of the first simulation image and a second simulation time of the second simulation image such that each of the sequence of sampling times is equal to or later than the first simulation time and is equal to or earlier than the second simulation time; and for each sampling time of the sequence of sampling times: computing a first projection of the first simulation image according to a respective expected point of view of the sensor in the simulation at the sampling time; computing a second projection of the second simulation image according to the expected point of view of the sensor in the simulation at the sampling time; and combining the first projection and the second projection to produce one partial simulation image of the sequence of partial simulation images, where the estimated simulation time thereof is the sampling time. Optionally, computing the sequence of partial simulation images further comprises applying a hole-filling algorithm to the one partial simulation image. As a projection may produce an image that has holes, i.e. one or more blank projected pixels, applying a hole-filling algorithm increases accuracy of a partial simulation image compared to an image that contains one or holes. Optionally, each of the first projection and the second projection comprises a plurality of projected pixels. Optionally, combining the first projection and the second projection comprises: identifying a minimum time difference from a first time difference between the first simulation time and the sampling time and a second time difference between the second simulation time and the sampling time, where the first time difference is associated with the first projection and the second time difference is associated with the second projection; selecting one of the first projection and the second projection as a primary projection according to the minimum time difference associated therewith; selecting one of the first projection and the second projection that is not the primary projection as a secondary projection; identifying in the primary projection at least one blank projected pixel; and updating the at least one blank projected pixel in the primary projection according to an equivalent projected pixel in the secondary projection. Using as a primary projection a projection having a minimum time difference between a time associated therewith and the sampling time and updating the primary projection with equivalent one or more pixels in the secondary projection produces a more accurate partial simulation image than using as a primary projection a projection associated with another time having greater difference from the sampling time. Optionally, the sequence of sampling times has an identified amount of sampling times that is less than or equal to 200. Using a sequence of sampling times having an amount of sampling times that is less than 200 allows using an amount of computation resources that does not exceed another amount of resources used when increasing actual simulation rate (where the simulated sensor point-cloud is computed using a sequence of partial simulation images computed for the sequence of sampling times), while still increasing accuracy of the simulated sensor point-cloud. Optionally, computing the at least one simulated sensor point-cloud comprises computing a plurality of capture masks, one for each estimated simulation time of one of the sequence of partial simulation images and each estimated simulation time of one of the sequence of partial simulation images is a sampling time of the sequence of sampling times. Matching a capture mask to a sampling time increases accuracy of the simulated sensor point-cloud compared to using a capture mask that is not aligned with the sampling time. Optionally, the system further comprises at least one graphical processing unit connected to the at least one processing circuitry and the two point of view transformations are computed, where computing the two point of view transformations comprises providing each of the two simulation images to the at least one graphical processing unit. Using a graphical processing unit reduces an amount of resources of a central processing unit required to compute the point of view transformations compared to computing the point of view transformations using the central processing unit.

With reference to the first and second aspects, in a fifth possible implementation of the first and second aspects the system further comprises at least one graphical processing unit connected to the at least one processing circuitry and applying the capture mask to a partial simulation image of the sequence of partial simulation images comprising providing the capture mask and the partial simulation image to the at least one graphical processing unit. Using a graphical processing unit reduces an amount of resources of a central processing unit required to apply a capture mask compared to applying the capture mask using the central processing unit.

With reference to the first and second aspects, in a sixth possible implementation of the first and second aspects each of the sequence of simulation images comprises a plurality of simulated pixels and each of the plurality of simulated pixels comprises at least one simulation value selected from the group of simulation values of: a depth, an object instance identification value, an object class value, a distance, an angle, a material identification value, an angle, an intensity, a color identification value, a beam width, a percent of a beam, a multi-path return count value, a velocity value, a scan pattern point index, a fill factor, a structure identification value, and a simulated return value.

With reference to the first and second aspects, in a seventh possible implementation of the first and second aspects the scanning pattern comprises a set of scan entries, each comprising at least one of: an elevation angle, an azimuth angle and a temporal offset. Using information including, but not limited to, one or more of an elevation angle, an azimuth angle and a temporal offset increases accuracy of a capture mask computed using the scanning pattern, thus increasing accuracy of the at least one simulated sensor point-cloud.

With reference to the first and second aspects, in an eighth possible implementation of the first and second aspects the sensor is selected from the group of sensors consisting of: a rolling shutter camera and a light detection and ranging (LIDAR) sensor.

With reference to the first and second aspects, in a ninth possible implementation of the first and second aspects the perception system comprising the sensor is selected from a group of systems consisting of: an autonomous driving system, an advanced driver-assistance system (ADAS), and a three-dimensional scanning system.

With reference to the first and second aspects, or the first implementation of the first and second aspects, in a tenth possible implementation of the first and second aspects the at least one processing circuitry is further adapted for: dividing the capture interval into a sequence of sub-intervals; and associating a sampling time with each of the sequence of sub-intervals, computed according to a relation between the capture interval and the sub-interval. Optionally, wherein each estimated simulation time of one of the sequence of partial simulation images is a sampling time associated with one of the sequence of sub-intervals. Optionally, the scanning pattern comprises a set of scan entries and computing the plurality of capture masks further comprises for each of the sequence of sub-intervals: identifying a subset of scan entries of the set of scan entries associated with the sub-interval according to the temporal distribution of the capture interval; dividing the subset of scan entries into a plurality of further subsets of scan entries according to a spatial distribution of the subset of scan entries; and computing each of the plurality of capture masks for one of the plurality of further subsets of scan entries according to the scanning pattern, the sampling time associated with the sub-interval and the further subset of scan entries. Optionally, the at least one processing circuitry is further adapted for: computing a plurality of camera tasks, each having a field-of-view (FoV) computed for one of the further subsets of scan entries such that a camera having the FoV and operated in the environment captures a subset of captured data points of the plurality of captured data points according to the further subset of scan entries; associating each of the plurality of camera tasks with a simulation time according to the sampling time associated with the respective further subset of scan entries used to compute the camera task; and generating the sequence of partial simulation images using a simulation generator according to the plurality of camera tasks. Using a separate camera task having a FoV computed for a further subset of scan entries, where the further subset of scan entries is computed according to a temporal distribution of the scanning pattern and a spatial distribution of the plurality of scan entries allows generating each of the sequence of partial simulation images by the simulation generator without computing a full simulation image, reducing an amount of computation resources required to generation the simulated sensor point-cloud compared to increasing simulation rate and generating full simulation images. Optionally, the system further comprises at least one graphical processing unit connected to the at least one processing circuitry and at least one of the sequence of partial simulation images is generated by providing to the at least one graphical processing unit the FoV of one of the plurality of camera tasks and simulation data describing the simulated environment. Using a graphical processing unit reduces an amount of resources of a central processing unit required to compute the camera task compared to computing the camera task using the central processing unit. Optionally, computing the plurality of capture masks further comprises deleting from the plurality of further subsets of scan entries at least one empty subset of scan entries. Optionally, computing the plurality of capture masks further comprises moving at least one scan entry from one of the further subsets of scan entries to another subset of scan entries according to at least one balancing criterion. Optionally, the at least one balancing criterion comprises at least one of: an amount of scan entries in a subset of scan entries, a distance between two scan entries of a subset of scan entries, and amount of further subsets of scan entries. Deleting at least one empty set of scan entries from the plurality of further subsets, and additionally or alternatively moving one or more scan entries between further subsets allows reducing an amount of camera tasks required to compute the plurality of partial simulation images, and additionally or alternatively facilitates reducing complexity of computation of a camera task by reducing an amount of scan entries associated therewith.

With reference to the first and second aspects, or the first implementation of the first and second aspects, in an eleventh possible implementation of the first and second aspects each capture mask of the plurality of capture masks comprises a plurality of capture entries, each describing a location relative to the sensor in the environment; and computing the plurality of capture masks further comprises for at least one of the plurality of capture masks modifying at least one of the capture masks plurality of capture entries according to at least one noise function. Adding noise increases similarity between the simulated sensor point-cloud and a sensor point-cloud captured by a sensor in a physical scene, thus increasing usability of the simulated sensor point-cloud.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

8

Figure 9:
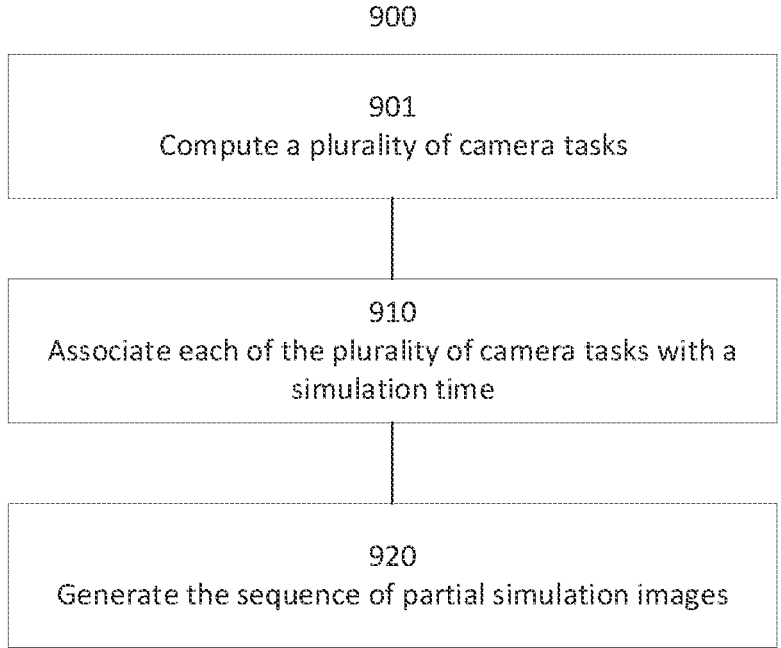

FIG. 9 is a flowchart schematically representing another optional flow of operations for producing a sequence of partial simulation images, according to some embodiments.

DESCRIPTION OF SPECIFIC EMBODIMENTS OF THE INVENTION

Some embodiments described in the present disclosure relate to simulated data and, more specifically, but not exclusively, to simulated sensory data for autonomous driving systems comprising one or more perception systems.

While the following description focuses on generating synthetic data for training a perception system, synthetic data generated by using the systems and methods described herewithin may be used additionally, or alternatively, to verify a perception system, to validate a perception system, to test a perception system, or any combination thereof.

The term "scanning pattern" refers to a temporal distribution in the capture interval of a plurality of captured data points of a sensor point-cloud. A scanning pattern may be described by a set of scanning points, each associated with a temporal offset from a beginning of the capture interval and with an elevation angle of a sensor and an azimuth angle of a sensor, where the elevation angle and the azimuth angle are relative to an identified orientation of the sensor. In some scanning patterns, the elevation angle and additionally or alternatively the azimuth angle are a function of the temporal offset. For example, when a sensor rotates in a 360-degree circle, an elevation angle may be fixed for a rotation with an azimuth angle changing for each data point captured in the rotation. In this example, the azimuth angle may be computed using a function according to a rotation velocity of the sensor. The function may be linear. In another example, the azimuth angle for each data point captured in the rotation is selected from a set of fixed steps. Some sensors have more than one scanning beam, for example, a LIDAR may have more than one laser. Optionally, each of the more than one scanning beam uses a fixed elevation. A scanning pattern may be linear. A scanning pattern may be fan shaped. A scanning pattern may be serpentine. A sensor may scan in more than one serpentine concurrently, using more than one scanning beam.

When a sensor captures the plurality of captured data points of a point-cloud incrementally in a capture interval while moving relative to an object in the environment, the relative position of the object with respect to the sensor may change throughout the capture interval. As a result, a captured object in the point-cloud, that is equivalent to the object in the environment, may be distorted compared to the object in the environment. This distortion is known as "rolling shutter effect". For example, a vertical object may appear as a staggered diagonal object.

When training a perception system with data captured in a physical environment, it is difficult to annotate point-cloud data, resulting in poor quality training data. A possible solution is training the perception system using synthetic data. When generating synthetic data simulating data captured by a sensor operating in a scanning pattern in a capture interval, there is a need to simulate the rolling shutter effect such that a simulated sensor point-cloud is self-consistent, correctly simulating a sensor point-cloud as the sensor point-cloud would be captured by a sensor operating in an environment equivalent to a simulated environment.

Simulation data of a simulated environment typically comprises a sequence of simulation images, each simulation image of the sequence of simulation images associated with a simulation time and optionally describing a ground truth of the simulated environment at the respective simulation time thereof. Optionally, the ground truth includes geographical feature attributes of the simulated environment. Optionally, the ground truth includes features of one or more objects in the simulated environment. For a moving object, the ground truth may include the moving object's velocity and additionally or alternatively the moving object's direction. Optionally, for an object in the simulated environment, the ground truth includes information describing physical properties of the object, some examples including a material the object is made of and one or more dimensions of the object. The ground truth optionally includes one or more climate features of the simulated environment, some examples including temperature and humidity. Optionally, the ground truth includes information that allows associating each point in the simulation image with coordinates in a known three-dimensional (3D) space, for example a global world coordinate system. In addition, each simulation image may include information that can be used to transform the simulation image into a point-cloud.

Ray-tracing is a known method for generating realistic looking images by following a path that a ray of light takes through an image to create an image simulating the effects that light rays have on objects they encounter. Ray-tracing can be used to compute from the ground truth in the sequence of simulation images what a scanning beam of a sensor may encounter according to the scanning pattern—what material the scanning beam may encounter, at what angle the scanning beam may encounter an object, at what distance, etc., and thus to compute a simulated sensor point-cloud. However, ray-tracing is an expensive method to implement in terms of computing resources such as computation cycles and memory. In addition, most current graphics hardware is not optimized for ray-tracing. As a result, it may not be cost effective to use ray-tracing to generate a simulated sensor point-cloud.

In addition, the quality of a simulated sensor point-cloud computed using ray-tracing depends on a simulation rate of the sequence of simulation images. When the simulation rate of the sequence of simulation images is high enough and close to a sampling rate of the sensor, ray-tracing may produce a simulated sensor point-cloud that is a good approximation of a sensor point-cloud captured by a sensor operating in an environment equivalent to the simulated environment. According to some current common practices, a common simulation rate produces several dozens of simulation images per second, for example 30 simulations images per second. On the other hand, some common LIDAR sensors sample at an effective sampling rate that is one or two orders of magnitude greater than current common simulation rates. As a result, when using ray-tracing to compute a simulated sensor point-cloud the rolling shutter effect may be lost because the simulation rate is too slow compared to a sampling rate of a sensor operating in a physical environment. For example, a moving object captured by the simulated sensor in one simulation image may be out of the simulated sensor's range in the next simulation image in the sequence of simulation images, whereas in a physical environment a sensor would capture different parts of the object at different temporal offsets in one capture interval. To produce a good quality simulated sensor point-cloud, the simulation rate for generating the sequence of simulation images must be significantly greater than common simulation rates, by one or even two orders of magnitude. Such high simulation speeds may require computing resources, for example computation cycles and memory, which are beyond what is available in some simulation systems.

An alternative method to using ray-tracing includes applying one of a set of masks to each of the sequence of simulation images, where each of the set of masks is indicative of a sub-set of captured data-points that would be captured by a sensor at a time equivalent to a simulation time associated with the simulation image the mask is applied to. This method, like ray-tracing, is limited by the simulation rate, where a slow simulation rate leads to losing the rolling shutter effect in generated simulated sensor point-clouds.

For brevity and clarity, as used herewithin, the term "simulated sensor point-cloud captured by a simulated sensor in a simulated environment" is used to mean, "simulated sensor point-cloud simulating a sensor point-cloud captured by a sensor operating in a physical environment that is equivalent to a simulated environment comprising the simulated sensor", and the two phrases are used interchangeably.

To increase accuracy of one or more simulated sensor point-clouds without increasing simulation rate, the present disclosure proposes computing a sequence of partial simulation images, and computing one or more simulated sensor point-clouds using the sequence of partial simulation images. Optionally, the sequence of partial simulation images is used to produce a plurality of simulated temporal fragments point-clouds, each simulating part of a point-cloud, and combining the plurality of simulated temporal fragment point-clouds to produce the simulated sensor point cloud. Computing a sequence of partial simulation images requires fewer computing resources than increasing the simulation environment's simulation rate and thus facilitates increasing accuracy of a simulated sensor point-cloud generated using the sequence of partial simulation images in a more cost effective manner than increasing the simulation environment's simulation rate. Increasing accuracy of the simulated sensor point-cloud increases accuracy of a model trained and additionally, or alternatively, verified, validated, tested, or any combination thereof, using the simulated sensor point-cloud.

Optionally, the simulated sensor simulates a sensor operating in a scanning pattern. In some embodiments described herewithin, the present disclosure further proposes computing the sequence of partial simulation images according to a temporal distribution of the scanning pattern in the capture interval. Optionally, the sequence of partial simulation images is computed additionally according to a spatial distribution of the scanning pattern in a 3D simulation environment around a simulated location of the sensor in the 3D simulation environment. In such embodiments, the temporal distribution of the scanning pattern, and additionally or alternatively the spatial distribution of the scanning pattern, divides the scanning pattern among a plurality of parts of the simulation environment (a plurality of zones), each equivalent to a part of an environment, which is simulated by the simulation environment, such that each zone is associated with part of the scanning pattern. Thus, the scanning pattern is divided into a plurality of parts of the scanning pattern. Optionally, each of the plurality of parts of the scanning pattern is associated with an estimated simulation time.

Figure 1:
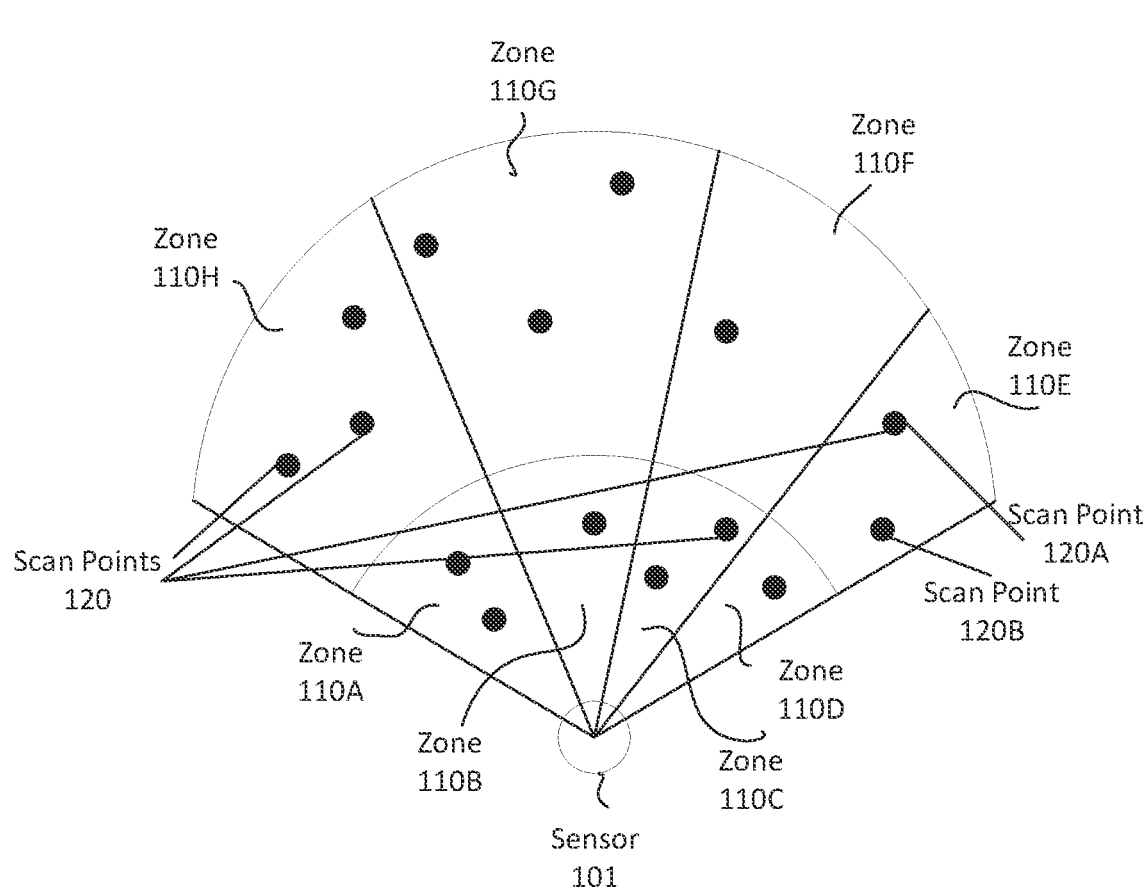
FIG. 1 is a schematic diagram of an exemplary scanning pattern 100, according to some embodiments.

Reference is now made to FIG. 1, showing a schematic diagram of an exemplary scanning pattern 100, according to some embodiments. Optionally, scanning pattern 100 comprises plurality of scan points 120 (for clarity of the drawing, not all scan points are numbered). Optionally, sensor 101 captures scanning pattern 100 in a capture interval. In this example, scanning pattern 100 is distributed into a plurality of zones, comprising zone 110A, zone 110B, zone 110C, zone 110D, zone 110E, zone 110F, zone 110G and zone 110H, references collectively as plurality of zones 110.

Optionally, each of the sequence of partial simulation images is computed for one of the zones using a simulated camera task having a field-of-view (FoV) such that a camera having the FoV and operated in the environment captures the part of the scanning pattern associated with the zone. For example, scanning pattern 100 optionally comprises scan point 120A and scan point 120B. Optionally, scan point 120A and scan point 120B are members of zone 110E. Optionally, a simulated camera task is associated with zone 110E such that a camera having a FoV and operated in the environment captures scan point 120A and scan point 120B. Optionally, at least one of the sequence of partial simulation images is computed using such a simulated camera task.

A simulated camera task, simulating a camera having a FoV and operating in the environment, requires fewer computing resources than generating an entire simulation frame. Thus, using one or more simulated camera tasks, each to compute one or more of the sequence of partial simulation images, requires fewer computation resources than increasing the simulation environment's simulation rate.

Optionally, one or more of the sequence of partial simulation images are computed by a graphical processing unit (GPU) using one or more FoV of one or more simulated camera tasks, further reducing an amount of general processor processing time required to compute the sequence of partial simulation images.

In addition, in some embodiments described herewithin, the present disclosure proposes computing each partial simulation image of the sequence of partial simulation images by computing two point-of-view (POV) transformations, each computed for one of the sequence of simulation images, and combining the two POV transformations to produce the partial simulation image. When computing a POV transformation of a simulation image to create a projected image, not all pixels in the projected image have a source in the simulation image, for example due to occlusion, truncation, or resolution of the source image. This creates holes in the projected image, where one or more pixels have no value. Combining two or more POV transformations facilitates reducing an amount of holes in the partial simulation image, thus increasing accuracy of the partial simulation image.

Figure 2:
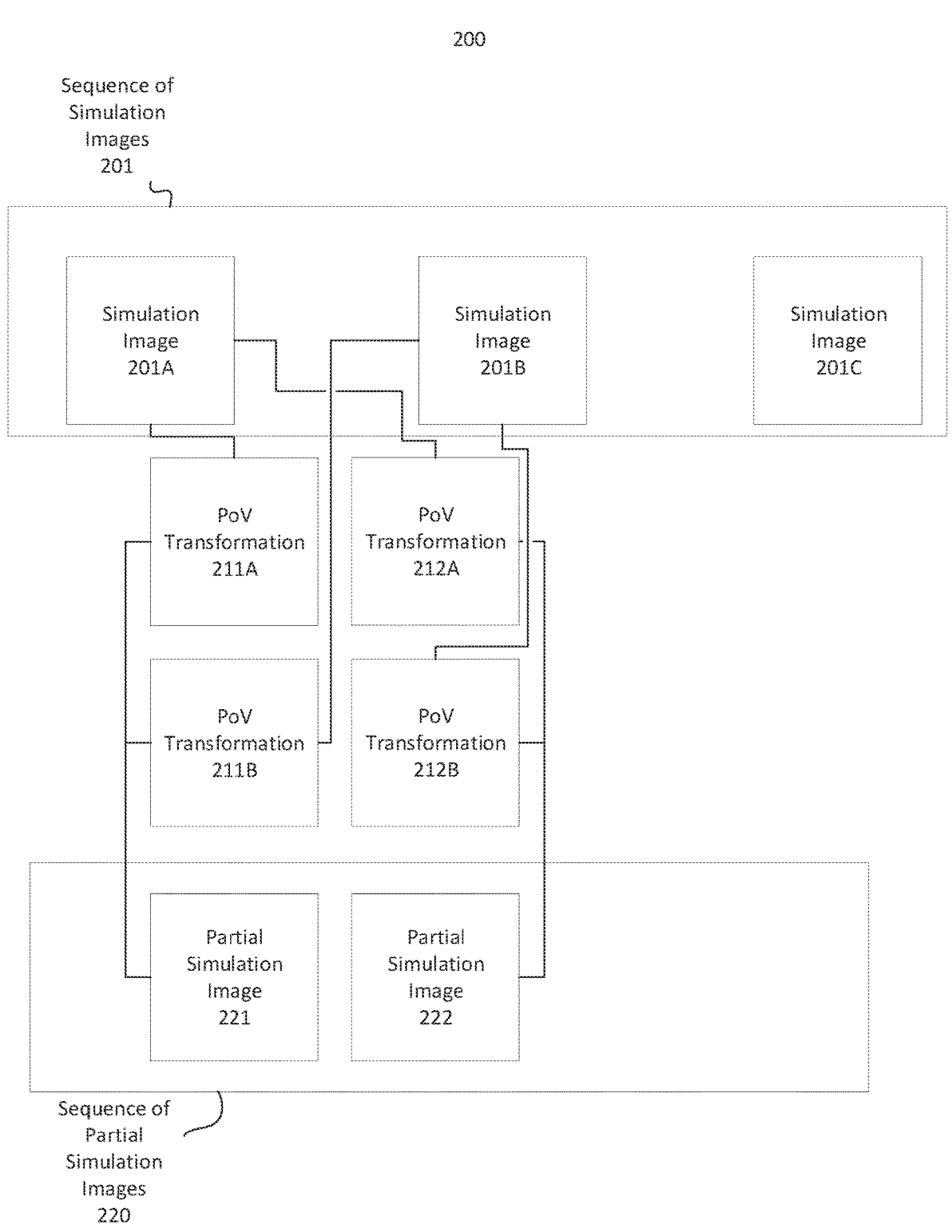
FIG. 2 is a schematic block diagram of an exemplary generation of a sequence of partial simulation images, according to some embodiments.

Reference is now made also to FIG. 2, showing a schematic block diagram of an exemplary generation of a sequence of partial simulation images 200, according to some embodiments. In this example, sequence of simulation images 201 comprises simulation image 201A, simulation image 201B and simulation image 201C. Optionally, sequence of partial simulation images 220 comprises partial simulation image 221 and partial simulation image 222. Optionally, partial simulation image 221 is computed by combining POV transformation 211A and POV transformation 211B. Optionally, POV transformation 211A is a POV transformation computed for simulation image 201A and POV transformation 211B is a POV transformation computed for simulation image 201B.

Similarly, in this example, POV transformation 212A is another POV transformation computed for simulation image 201A, POV transformation 212B is another POV transformation computed for simulation image 201B and partial simulation image 222 is computed by combining POV transformation 212A and POV transformation 212B.

Optionally, the two POV transformations are computed using a GPU. Combining two POV transformations increases accuracy of the partial simulation image compared to using only one POV transformation. Computing the two POV transformations requires fewer computing resources than producing an additional simulation image by increasing the simulation rate of the simulation environment. Thus, using two POV transformations increases the accuracy of the partial simulation image using fewer computing resources than by increasing the simulation rate of the simulation environment.

Optionally, each of the sequence of partial simulation images is associated with an estimated simulation time. Optionally, at least one of the one or more simulated sensor point-clouds is computed by applying a capture mask to each of the sequence of partial simulation images. Optionally, a capture mask applied to a partial simulation image is computed according to the scanning pattern and a relation between the capture interval and an estimated simulation time associated with the partial simulation image. Using a capture mask that is computed according to the scanning patterns and a relation between the capture interval and an estimated simulation time associated with the partial simulation image facilitates generating a part of a simulated sensor point-point cloud that is in line with the incremental nature of the sensor's operation in the physical environment, increasing accuracy of the simulated sensor point-cloud.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
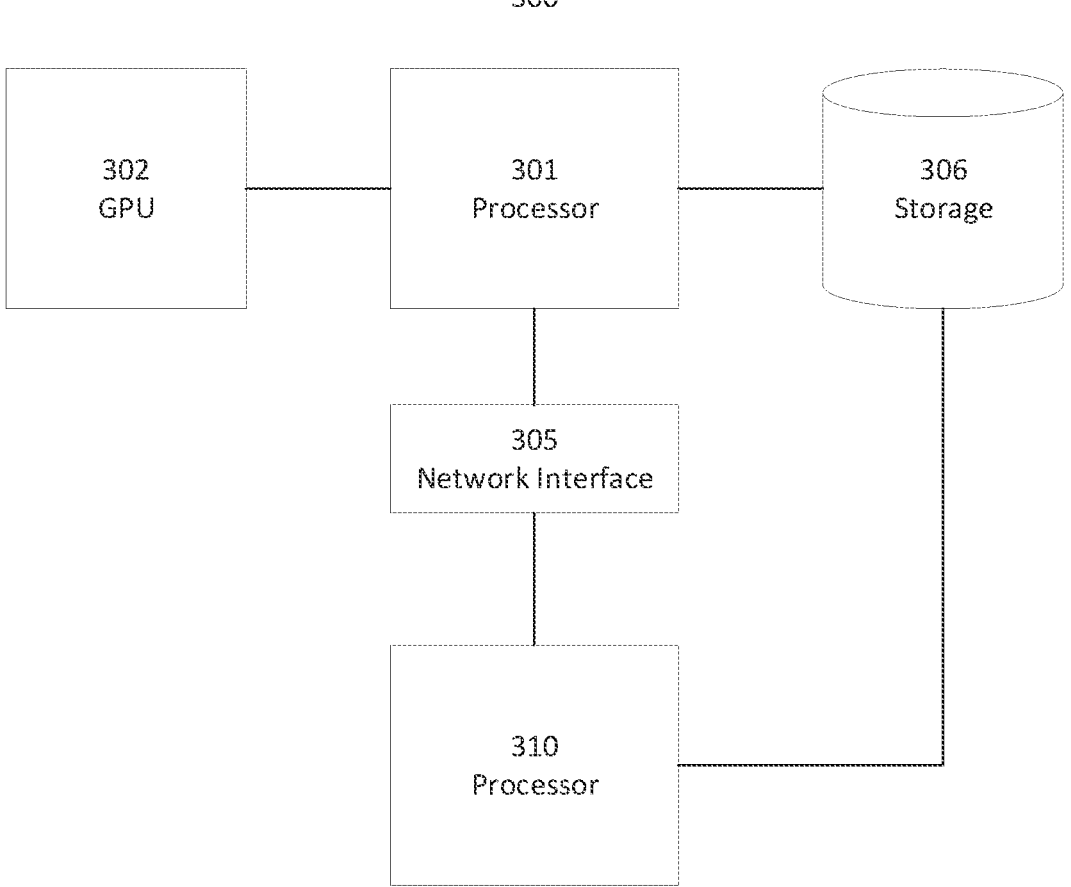
FIG. 3 is a schematic block diagram of an exemplary system, according to some embodiments.

Reference is now made to FIG. 3, showing a schematic block diagram of an exemplary system 300, according to some embodiments. Optionally, system 300 is used to generate synthetic data. Optionally, system 300 is used to train a perception system. Additionally, or alternatively, system 300 may be used to validate the perception system, to verify the perception system, to test the perception system, or any combination thereof. Optionally, system 300 comprises at least one hardware processor 301, optionally connected to one or more GPU 302. GPU 302 is optionally another processing unit. Optionally, GPU 302 is a tensor processing unit.

For brevity, henceforth the term "processing unit" is used to mean "at least one hardware processor", and the terms are used interchangeably. The processing unit may be any kind of programmable or non-programmable circuitry that is configured to carry out the operations described herewithin. The processing unit may be a GPU. The processing unit may comprise a GPU, for example GPU 302. The processing unit may comprise hardware as well as software. For example, the processing unit may comprise one or more processors and a transitory or non-transitory memory that carries a program that causes the processing unit to perform the respective operations when the program is executed by the one or more processors.

Optionally, the processing unit 301 is connected to one or more non-volatile digital storage 306. Some examples of a non-volatile digital storage are a hard disk drive, a network connected storage and a storage network. For brevity, henceforth the term "storage" is used to mean "one or more non-volatile digital storage", and the terms are used interchangeably. Optionally, storage 306 stores a sequence of simulation images, optionally generated by a simulation engine. Optionally, the processing unit 301 stores a sequence of partial simulation images on storage 306. Optionally, the processing unit 301 stores one or more simulated sensor point-clouds on storage 306.

Optionally, storage 306 is connected to the processing unit 301 via one or more digital communication network interface 305. For brevity, henceforth the term "network interface" is used to mean "one or more digital communication network interface" and the terms are used interchangeably.

Optionally, network interface 305 is connected to a local area network (LAN), for example an Ethernet network or a Wi-Fi network. Optionally, network interface 305 is connected to a wide area network (WAN), for example a cellular network or the Internet.

Optionally, the other processing unit 310 is connected to the processing unit 301, optionally via network interface 305. Optionally, the other processing unit 310 is connected to the processing unit 301 directly. Optionally, the other processing unit 310 executes one or more training engines for training a perception system. Optionally, the one or more training engines are executed by the processing unit 301.

Optionally, the perception system comprises a sensor, for example sensor 101. Optionally, the sensor is a rolling shutter camera. Optionally, the sensor is a light detection and ranging (LIDAR) sensor. Optionally, the perception system comprising the sensor is an autonomous driving system. Other examples of a perception system include, but are not limited to, an advanced driver-assistance system (ADAS) and a 3D scanning system.

To generate synthetic data, and additionally or alternatively to train the perception system, in some embodiments system 300 implements the following optional method. Additionally, or alternatively, system 300 implements the following optional method to perform one or more of: testing the perception system, validating the perception system and verifying the perception system.

Figure 4:
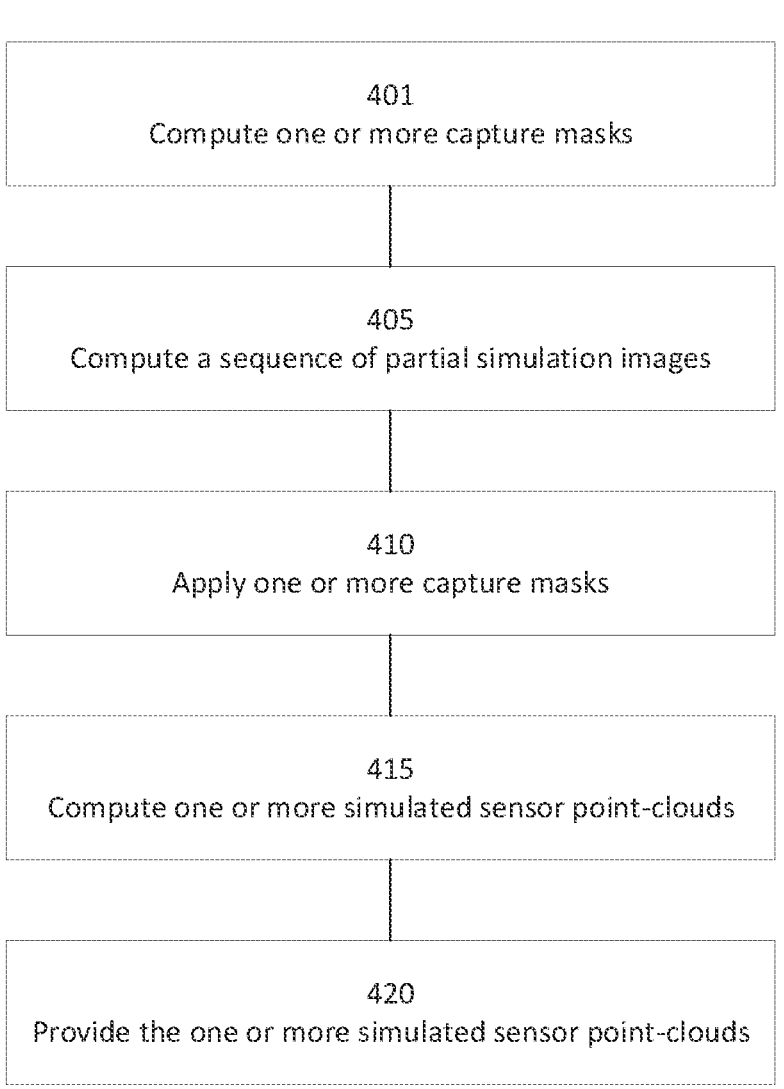
FIG. 4 is a flowchart schematically representing an optional flow of operations for generating synthetic data, according to some embodiments.

Reference is now made also to FIG. 4, showing a flow-chart schematically representing an optional flow of operations 400 for generating synthetic data, according to some embodiments. In such embodiments, in 405 the processing unit 301 computes a sequence of partial simulation images, for example sequence of partial simulation images 220. Optionally, each of the sequence of partial simulation images is associated with an estimated simulation time. Optionally, each of the sequence of partial simulation images is associated with part of a simulation environment at the respective estimated simulation time thereof.

Optionally, the sequence of partial simulation images is computed using a sequence of simulation images, for example sequence of simulation images 201. Optionally, the sequence of simulation images 201 is generated by a simulation generator. Optionally, each simulation image of the sequence of simulation images 201 is associated with a respective simulation time. Optionally, each simulation image of the sequence of simulation images 201 describes a ground truth of the simulated environment at the respective simulation time thereof. Optionally, each of the sequence of simulation images 201 comprises a plurality of simulated pixels.

The ground truth may include one or more geographical feature attributes. Optionally, the ground truth includes one or more environment feature attributes, some examples being temperature, humidity, and wind velocity. Optionally, the ground truth includes one or more attributes describing one or more objects of the simulation environment, for example a velocity of an object of the simulation environment and a direction of the object of the simulation environment. Optionally, the ground truth includes information that allows associated each point in an image with coordinates in a known 3D space. Optionally, each of the plurality of simulated pixels comprises at least one simulation value. Some examples of a simulation value include, but are not limited to: a depth, an object instance identification value, an object class value, a distance, an angle, a material identification value, an angle, an intensity, a color identification value, a beam width, a percent of a beam, a multi-path return count value, a velocity value, a scan pattern point index, a fill factor, a structure identification value, and a simulated return value. Some examples of a simulated return value include a simulated intensity, a simulated class, a simulated normal angle, a simulated material, a scan-pattern point index, a reference distance and a simulated fill factor. Optionally, a simulated value is an ideal value. Optionally, a simulated value simulates a noise applied to a simulated ideal value.

Optionally, one or more of the at least one simulation value are associated with a confidence value. Optionally, each simulation image of the sequence of simulation images 201 comprises information that can be used to transform the simulation image into a point-cloud. Optionally, each of the plurality of partial simulation images comprises another plurality of simulated pixels.

Optionally, the sequence of partial simulation images 220 simulates an increase simulation rate of the simulation environment. Optionally, for each partial simulation image of the sequence of partial simulation images 220, the estimated simulation time associated with the partial simulation image is between two respective simulation times of two simulation images of the sequence of simulation images 201. For example, an estimated simulation time associated with the partial simulation image 221 is optionally between a first simulation time associated with simulation image 201A and a second simulation time associated with simulation image 201B.

Optionally, in 401 the processing unit 301 computes a plurality of capture masks. Optionally, each capture mask of the plurality of capture masks comprises a plurality of capture entries, each describing a location relative to the sensor in the environment.

It should be noted that the processing unit 301 may execute step 401 before executing other steps. Optionally, the processing unit 301 executes step 401 while executing one or more other steps, for example while executing step 405 to compute the sequence of partial simulation images 220. Optionally, the processing unit 301 executes step 401 after executing step 405.

Optionally, the processing unit 301 computes each of the plurality of capture masks for an estimated simulation time of one of the sequence of partial simulation images 220. Optionally, the processing unit 301 computes a capture mask of the plurality of capture masks for each of the sequence of partial simulation images 220, and is associated therewith. Optionally, the processing unit 301 computes a capture mask of the plurality of capture masks according to a scanning pattern of the sensor 101 of the perception system and a relation between a capture interval of the sensor 101 and the respective estimated simulation time associated with the capture mask.

Optionally, the processing unit 301 divides the capture interval into a sequence of sub-intervals. Optionally, the processing unit 301 associates a sampling time with each of the sequence of sub-intervals, computed according to a relation between the capture interval and the sub-interval. Optionally, each estimated simulation time of one of the sequence of partial simulation images is a sampling time associated with one of the sequence of sub-intervals.

Optionally, the scanning pattern comprises a set of scan entries. Optionally, a scan entry comprises an elevation angle, for example an elevation angle of a scanning beam of the sensor. Optionally, a scan entry comprises an azimuth angle. Optionally, a scan entry comprises a temporal offset, for example a temporal offset relative to a start of a scanning interval. A scan entry may include some of the above and not include all of the above. For example, some LIDAR sensors use a set of identified elevations, and the azimuth angle associated with a scan entry is a function of the temporal offset of the scan entry. The function may be a linear function, with fixed steps. Optionally, the distribution of the scan entries over the scanning interval is non-linear. A sensor may have more than one scanning beam, for example a LIDAR with more than one laser. Optionally, each of the more than one scanning beam has an elevation angle different from other elevation angels of other of the more than one scanning beam. The set of scan entries may describe one or more serpentine scanning patterns. Optionally, the set of scan entries describes one or more fan scanning patterns.

Optionally, the processing unit 301 computes a partial simulation image of the sequence of partial simulation images 220 by combining two point of view simulations of two simulation images of the sequence of simulation images 201. To do so, in some embodiments the processing unit 301 executes the following optional method for each two consecutive simulation images of the sequence of simulation images 201, for example for simulation image 201A and simulation 201B, where simulation image 201A is a first simulation image and simulation image 201B is a second simulation image.

Figure 5:
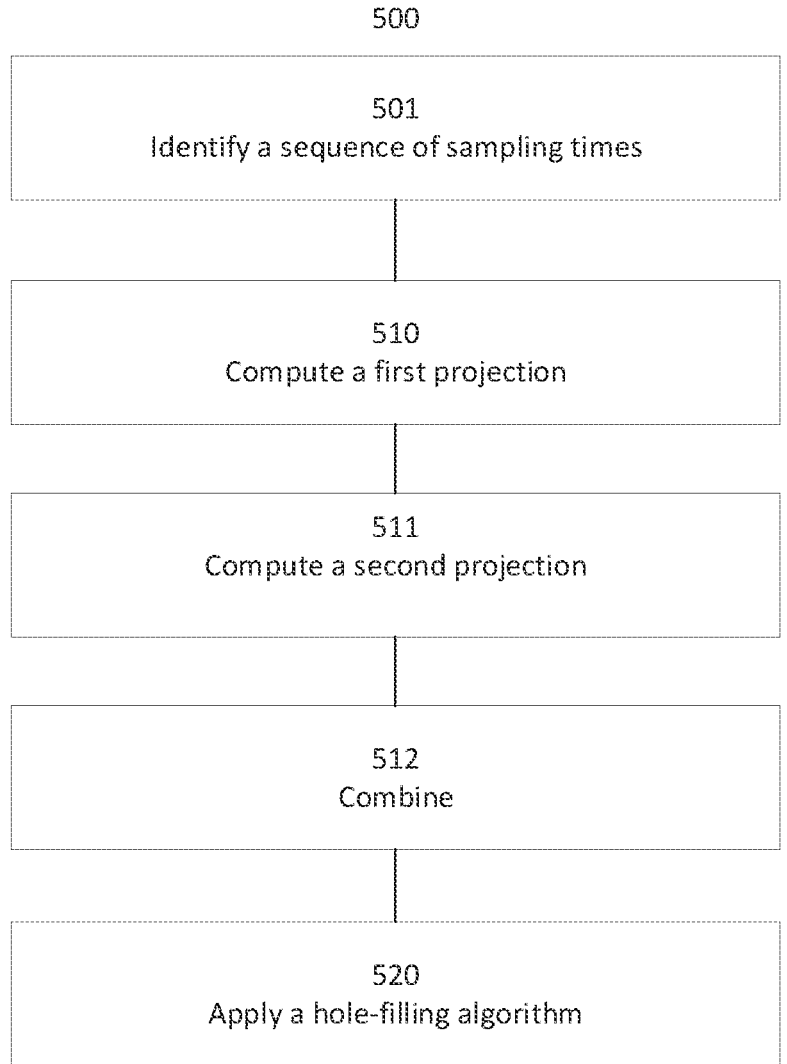
FIG. 5 is a flowchart schematically representing an optional flow of operations for producing a sequence of partial simulation images, according to some embodiments.

Reference is now made also to FIG. 5, showing a flow-chart schematically representing an optional flow of operations 500 for producing a sequence of partial simulation images, according to some embodiments. In such embodiments, in 501 the processing unit 301 identifies a sequence of sampling times in a simulation interval between the first simulation time associated with simulation image 201A and the second simulation time associated with simulation image 201B. Optionally, each of the sequence of sampling times is equal to or later than the first simulation time and is equal to or earlier than the second simulation time. Optionally, the sequence of sampling times has an identified amount of sampling times. Some examples of an amount of sampling times include, but are not limited to 2, 3, 5, 10, 20, 30, 50, and 100. Optionally, the identified amount of sampling times is less than 200. Using a sequence of sampling times having an amount of sampling times that is less than 200 allows increasing accuracy of the simulated sensor point-cloud using an amount of computation resources that does not exceed another amount of resources used when increasing actual simulation rate (where the simulated sensor point-cloud is computed using a sequence of partial simulation images computed for the sequence of sampling times).

Optionally, for each sampling time of the sequence of sampling times, the processing unit 301 computes two POV transformations. For example, for a sampling time of the sequence of sampling times, in 510 the processing unit 301 computes POV transformation 211A that is a projection of first simulation image 201A, according to a respective expected point of view of the sensor in the simulation at the sampling time. Optionally, POV transformation 211A comprises a plurality of projected pixels. Optionally, the processing unit 301 provides the first simulation image 201A to GPU 302 to compute POV transformation 211A. Optionally, for the sampling time, in 511 the processing unit 301 computes POV transformation 211B that is a projection of second simulation image 201B, according to the respective expected point of view of the sensor in the simulation at the sampling time. Optionally, POV transformation 211B comprises another plurality of projected pixels. Optionally, the processing unit 301 provides the second simulation image 201B to GPU 302 to compute POV transformation 211B. Optionally, the respective expected point of view of the sensor in the simulation at the sampling time is interpolated, optionally using simulation information from first simulation image 201A and additionally or alternatively from second simulation image 201B. In 512, the processing unit 301 optionally combines POV transformation 211A and POV transformation 211B to produce partial simulation image 221.

Figure 6:
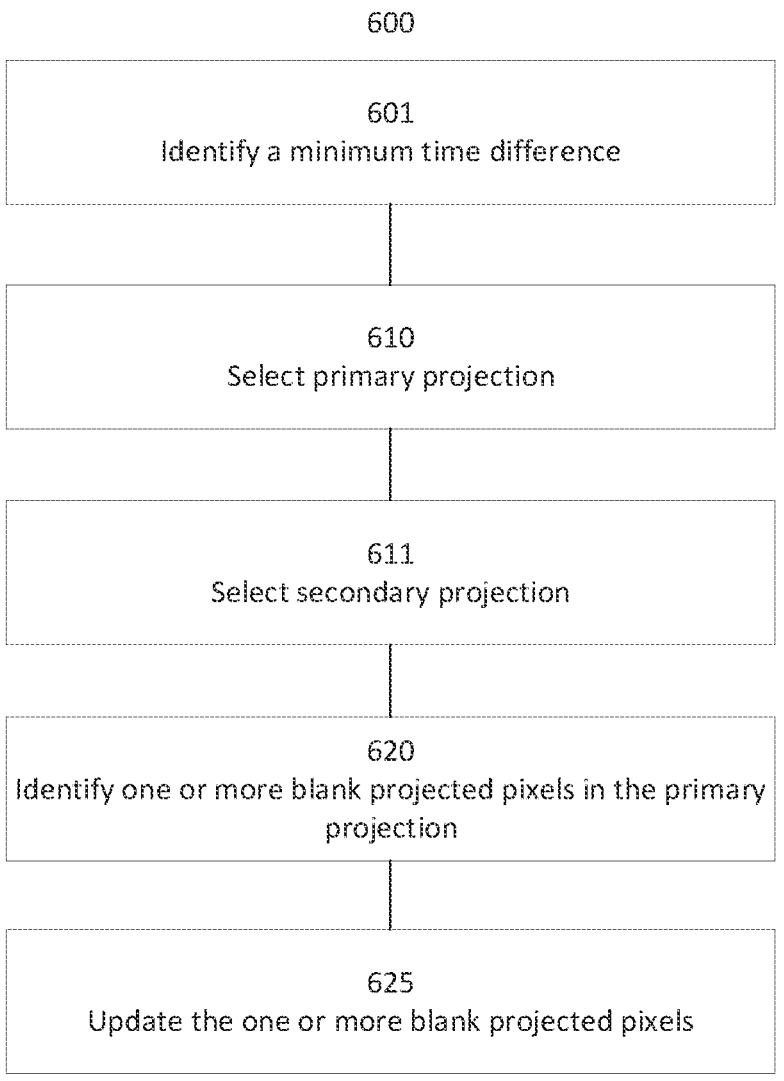
FIG. 6 is a flowchart schematically representing an optional flow of operations for producing a partial simulation image, according to some embodiments.

Reference is now made also to FIG. 6, showing a flow-chart schematically representing an optional flow of operations 600 for producing a partial simulation image, according to some embodiments. In such embodiments, in 601 the processing unit 301 identifies a minimum time difference of the sampling time from the first simulation time of simulation image 201A and the second simulation time of simulation image 201B. Optionally, the processing unit 301 computes a first time difference between the first simulation time and the sampling time. Optionally, the first time difference is associated with POV transformation 211A. Optionally, the processing unit 301 computes a second time difference between the second simulation time and the sampling time. Optionally, the second time difference is associated with POV transformation 211B. Optionally, the processing unit identifies the minimum time difference between the first time difference and the second time difference.

For example, the processing unit 301 may identify that the second time difference is less than the first time difference. It should be noted that in other examples the processing unit 301 may identify that the first time difference is the minimum time difference.

Continuing with this example, in 610 the processing unit 301 selects POV transformation 211B as a primary projection, according to the minimum time difference. In 611, the processing unit 301 selects POV transformation 211B, that is not the primary projection, as a secondary projection.

In 620, the processing unit 301 optionally identifies in the primary projection POV transformation 211B one or more blank projected pixels. In 625, the processing unit 301 optionally updates one or more blank projected pixels in POV transformation 211B according to one or more equivalent projected pixel in the secondary projection POV transformation 211A.

Reference is now made again to FIG. 5. In 520, the processing unit 301 optionally applies a hole-filling algorithm to partial simulation image 221. Optionally, the estimated simulation time of partial simulation image 221 is the sampling time for which POV transformation 211A and POV transformation 211B were computed.

Reference is now made again to FIG. 4. In 410, the processing unit 301 optionally applies to each of the sequence of partial simulation images a capture mask, optionally one of the plurality of capture masks computed in 401. Optionally, the processing unit 301 executes 401 in step 410. Optionally, for at least one of the sequence of partial simulation images, the processing unit 301 provides GPU 302 with a partial simulation image and a capture mask associated with the partial simulation image, to apply the capture mask to the partial simulation image.

In 415, the processing unit 301 optionally computes one or more simulated sensor point-clouds. Optionally, each simulated sensor point-cloud of the one or more simulated sensor point-clouds simulates a sensor point-cloud captured by sensor 101 in a capture interval when sensor 101 operates in the scanning pattern in an environment equivalent to a simulated environment. Optionally, to compute the one or more simulated sensor point-clouds the processing unit 301 applies to each of the sequence of partial simulation images one of the plurality of capture masks. Optionally, the processing unit 301 applies to each partial simulation image of the sequence of partial simulation images a capture mask of the plurality of capture masks where the capture mask was computed according to the scanning pattern and a relation between the capture interval and the estimated simulation time associated with the partial simulation image.

In some embodiments, at least one of the one or more simulated sensor point-clouds is generated using the following optional method.

Figure 7:
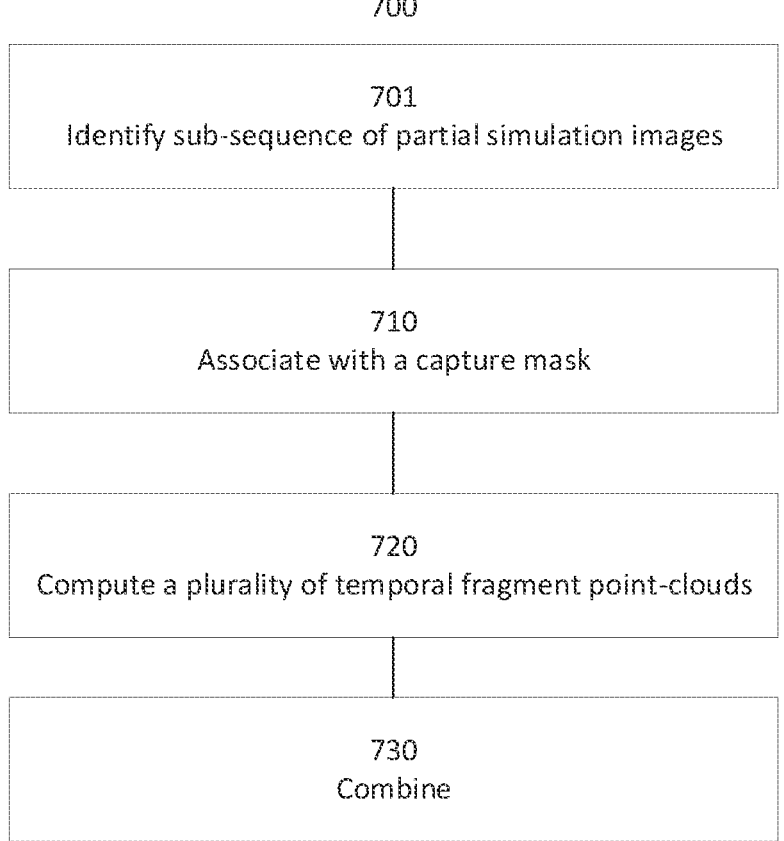
FIG. 7 is a flowchart schematically representing an optional flow of operations for producing a simulated sensor point-cloud, according to some embodiments.

Reference is now made also to FIG. 7, showing a flow-chart schematically representing an optional flow of operations 700 for producing a simulated sensor point-cloud, according to some embodiments. In such embodiments, in 701 the processing unit 301 identifies in the sequence of partial simulation images a sub-sequence of partial simulation images according to the capture interval of the simulated sensor point-cloud. In 710, the processing unit 301 optionally associates each partial simulation image of the sub-sequence of partial simulation images with one of the plurality of capture masks according to the respective relation between the capture interval and the respective estimated simulation time associated with the partial simulation image. Optionally, in 720 the processing unit 301 computes a plurality of simulated temporal fragment point clouds. Optionally, the processing unit 301 applies to each one partial simulation image of the sequence of partial simulation images the respective capture mask of the plurality of capture masks that is associated with the one partial simulation image. Optionally, in 730 the processing unit 301 combines the plurality of simulated temporal fragment point-clouds to produce the simulated sensor point-cloud.

Additionally, or alternatively, the sequence of partial simulation images may be generated according to a distribution of the scanning pattern. The distribution may be a temporal distribution of the scanning pattern in the capture interval. Additionally, or alternatively, the distribution may be a spatial distribution of the scanning pattern in a 3D simulation environment around a simulated location of a sensor. To do so, in some embodiments system 300 alternatively, or additionally, implements the following optional methods for computing the plurality of capture masks and the sequence of partial simulation images.

Figure 8:
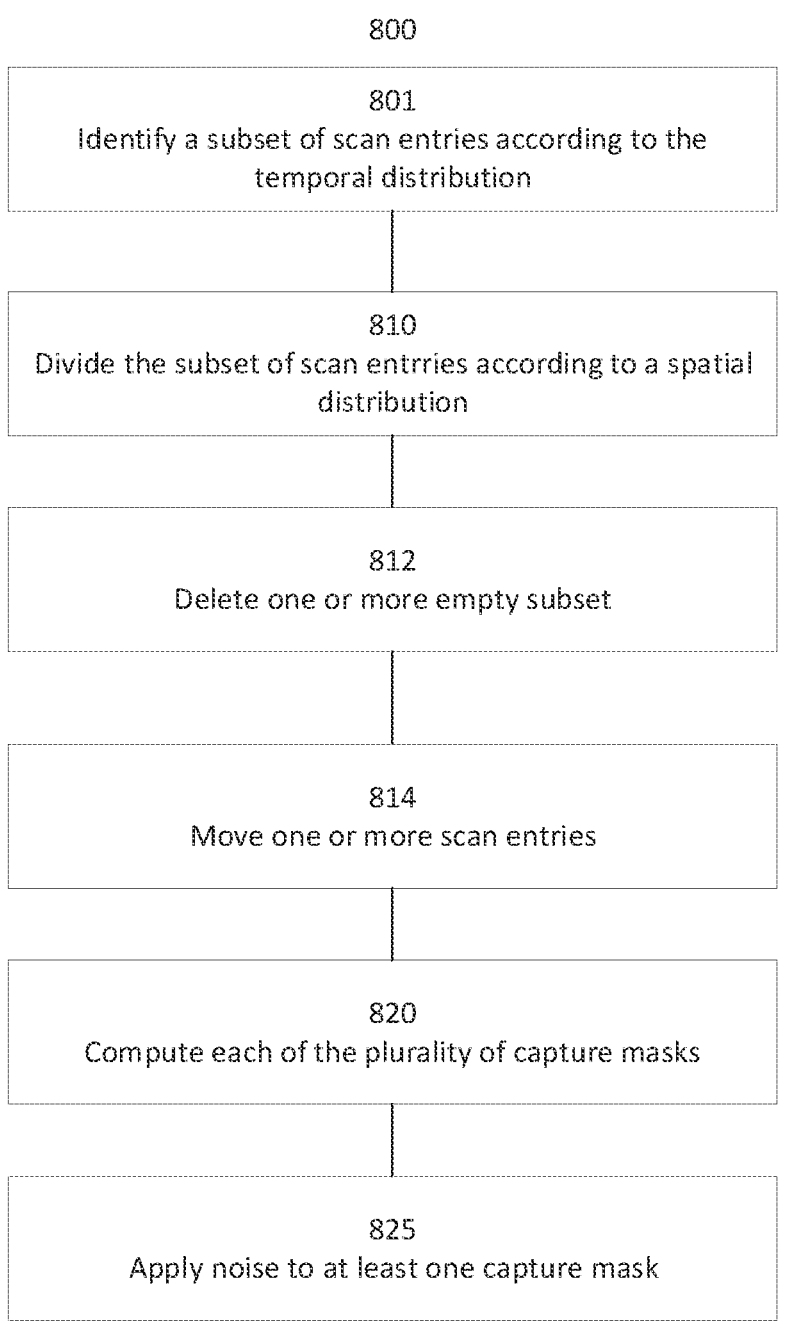
FIG. 8 is a flowchart schematically representing an optional flow of operations for computing a plurality of capture masks, according to some embodiments.

Reference is now made also to FIG. 8, showing a flow-chart schematically representing an optional flow of operations 800 for computing a plurality of capture masks, according to some embodiments. In such embodiments, when the capture interval is divided into a plurality of sub-intervals, for each of the plurality of sub-intervals, in 801 the processing unit 301 identifies a subset of scan entries of the set of scan entries of the scanning pattern where the subset of scan entries are associated with the sub-interval according to a temporal distribution of the capture interval. Optionally, in 810, the processing unit 301 divides the subset of scan entries into a plurality of further subsets of scan entries according to a spatial distribution of the subset of scan entries, where a scan entry describes a location in the 3D simulation environment relative to the simulated location of the sensor.

Distribution of the plurality of scan entries in the plurality of further subsets of scan entries may not be uniform, or balanced. The processing unit 301 optionally balances the plurality of further subsets of scan entries. For example, In 812, the processing unit 301 optionally deletes from the plurality of further subsets of scan entries one or more empty subsets of scan entries. Optionally, in 814, the processing unit 301 moves one or more scan entries from one of the plurality of further subsets of scan entries to another of the plurality of further subsets of scan entries, optionally according to one or more balancing criteria. An example of a balancing criterion is an amount of points in a subset. Optionally, the processing unit 301 merges two or more of the plurality of further subsets of scan entries. Optionally, the processing unit 301 splits at least one of the plurality of further subsets of scan entries.

Optionally, in 820 the processing unit 301 computes each of the plurality of capture masks for one further subset of scan entries of the plurality of further subsets of scan entries, optionally according to the scanning pattern, the sampling time associated with the sub-interval and the further subset of scan entries. Optionally, in 825, for at least one capture mask of the plurality of capture masks, the processing unit 301 modifies one or more of the at least one capture mask's plurality of capture entries according to one or more noise function.

Reference is now made also to FIG. 9, showing a flow-chart schematically representing another optional flow of operations 900 for producing a sequence of partial simulation images, according to some embodiments. Optionally, in 901 the processing unit 301 computes a plurality of camera tasks. Optionally, each of the camera tasks has a FoV computed for one of the further subsets of scan entries such that a camera having the FoV and operated in an environment equivalent to the simulated environment captures a subset of captured data points of the plurality of captured data points of a point-cloud according to the further subset of scan entries. In 910, the processing unit 301 optionally associates each of the plurality of camera tasks with a simulation time according to the sampling time associated with the respective further subset of scan entries that were used to compute the camera task.

In 920, the processing unit 301 optionally generates the sequence of partial simulation images using a simulation generator according to the camera tasks. Optionally, the processing unit 301 generates at least one of the sequence of partial simulation images by providing the FoV of one of the plurality of camera tasks and simulation data describing the simulated environment to GPU 302.

Reference is now made again to FIG. 4. In 420, the processing unit 301 optionally provides the one or more simulated sensor point-clouds to one or more training engines to train a perception system comprising sensor 101. Optionally, the one or more training engines are executed by the processing unit 301. Optionally, the one or more training engines are executed by other processing unit 310. Optionally, the processing unit 301 stores the one or more simulated sensor point-clouds on storage 306. Additionally, or alternatively, the processing unit 301 provides the one or more simulated sensor point-clouds to one or more testing engines, for testing the perception system. Additionally, or alternatively, the processing unit 301 provides the one or more simulated sensor point-clouds to one or more validation engines, for validating the perception system. Additionally, or alternatively, the processing unit 301 provides the one or more simulated sensor point-clouds to one or more verification engines, for verifying the perception system.

In some embodiments the system 300 is additionally, or alternatively, a training system for training a perception system. In such embodiments, the processing unit 301 accesses one or more simulated sensor point-clouds produced using method 400. Optionally, the processing unit 301 retrieves the one or more simulated sensor point-clouds from storage 306. Optionally, the processing unit 301 receives the one or more simulated sensor point-clouds from other processing unit 302. Optionally, the processing unit 301 provides the one or more simulation sensor point-clouds to one or more perception engines of the perception system. Optionally, the one or more perception engines are executed by one or more of the processing unit 301 and the other processing unit 302.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors and scanning patterns will be developed and the scope of the terms sensor and scanning pattern are intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable sub-combination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for generating synthetic data, comprising at least one processing circuitry adapted for:

computing a sequence of partial simulation images, where each of the sequence of partial simulation images is associated with an estimated simulation time and with part of a simulated environment at the respective estimated simulation time thereof;

computing at least one simulated sensor point-cloud, each simulated sensor point-cloud simulating a sensor point-cloud captured in a capture interval by a sensor operated in a scanning pattern from an environment equivalent to a simulated environment, where the scanning pattern describes a temporal distribution in the capture interval of a plurality of captured data points of the sensor point-cloud, by applying to each partial simulation image of the sequence of partial simulation images a capture mask computed according to the scanning pattern and a relation between the capture interval and an estimated simulation time associated with the partial simulation image; and providing the at least one simulated sensor point-cloud to at least one training engine to train a perception system comprising the sensor;

wherein the sequence of partial simulation images is computed using a sequence of simulation images generated by a simulation generator, where each simulation image of the sequence of simulation images describes a ground truth of the simulated environment at the respective simulation time thereof;

wherein each of the sequence of simulation images comprises a plurality of simulated pixels;

wherein each of the plurality of simulated pixels comprises at least one simulation value selected from the group of simulation values of: a depth, an object instance identification value, an object class value, a distance, an angle, a material identification value, an angle, an intensity, a color identification value, a beam width, a percent of a beam, a multi-path return count value, a velocity value, a scan pattern point index, a fill factor, a structure identification value, and a simulated return value; and wherein for each partial simulation image of the sequence of partial simulation images:

the estimated simulation time associated therewith is between two respective simulation times of two simulation images of the sequence of simulation images; and the partial simulation image is computed by combining two point of view transformations of the two simulation images;

wherein computing the sequence of partial simulation images comprises for each two consecutive simulation images of the sequence of simulation images having a first simulation image and a second simulation image;

identifying a sequence of sampling times in a simulation interval between a first simulation time of the first simulation image and a second simulation time of the second simulation image such that each of the sequence of sampling times is equal to or later than the first simulation time and is equal to or earlier than the second simulation time; and for each sampling time of the sequence of sampling times:

computing a first projection of the first simulation image according to a respective expected point of view of the sensor in the simulation at the sampling time;

computing a second projection of the second simulation image according to the expected point of view of the sensor in the simulation at the sampling time; and combining the first projection and the second projection to produce one partial simulation image of the sequence of partial simulation images, where the estimated simulation time thereof is the sampling time;

wherein each of the first projection and the second projection comprises a plurality of projected pixels; and wherein combining the first projection and the second projection comprises:

identifying a minimum time difference from a first time difference between the first simulation time and the sampling time and a second time difference between the second simulation time and the sampling time, where the first time difference is associated with the first projection and the second time difference is associated with the second projection;

selecting one of the first projection and the second projection as a primary projection according to the minimum time difference associated therewith;

selecting one of the first projection and the second projection that is not the primary projection as a secondary projection;

identifying in the primary projection at least one blank projected pixel; and updating the at least one blank projected pixel in the primary projection according to an equivalent projected pixel in the secondary projection.

2. The system of claim 1, wherein computing the at least one simulated sensor point-cloud comprises computing a plurality of capture masks, one for each estimated simulation time of one of the sequence of partial simulation images, and computed according to the scanning pattern and a relation between the capture interval and the respective estimated simulation time.

3. The system of claim 2, wherein computing a simulated sensor point-cloud of the at least one simulated sensor point-cloud further comprises:

identifying in the sequence of partial simulation images a sub-sequence of partial simulation images according to the capture interval of the simulated sensor point-cloud;

associating each of the sub-sequence of partial simulation images with one of the plurality of capture masks according to the respective relation between the capture interval and the respective estimated simulation time associated with the partial simulation image;

computing a plurality of simulated temporal fragment point-clouds, each for one of the sub-sequence of partial simulation images, by applying to each one partial simulation image of the sequence of partial simulation images the capture mask of the plurality of capture masks associated therewith; and combining the plurality of simulated temporal fragment point-clouds to produce the simulated sensor point-cloud.

4. The system of claim 2, wherein each capture mask of the plurality of capture masks comprises a plurality of capture entries, each describing a location relative to the sensor in the environment; and wherein computing the plurality of capture masks further comprises for at least one of the plurality of capture masks modifying at least one of the capture masks plurality of capture entries according to at least one noise function.

5. The system of claim 1, further comprising at least one graphical processing unit connected to the at least one processing circuitry;

wherein applying the capture mask to a partial simulation image of the sequence of partial simulation images comprising providing the capture mask and the partial simulation image to the at least one graphical processing unit.

6. The system of claim 1, wherein the scanning pattern comprises a set of scan entries, each comprising at least one of: an elevation angle, an azimuth angle and a temporal offset.

7. The system of claim 1, wherein the sensor is selected from the group of sensors consisting of: a rolling shutter camera and a light detection and ranging (LIDAR) sensor.

8. The system of claim 1, wherein the perception system comprising the sensor is selected from a group of systems consisting of: an autonomous driving system, an advanced driver-assistance system (ADAS), and a three-dimensional scanning system.

9. The system of claim 1, wherein the at least one processing circuitry is further adapted for:

dividing the capture interval into a sequence of sub-intervals; and associating a sampling time with each of the sequence of sub-intervals, computed according to a relation between the capture interval and the sub-interval;

wherein each estimated simulation time of one of the sequence of partial simulation images is a sampling time associated with one of the sequence of sub-intervals.

10. The system of claim 9, wherein the scanning pattern comprises a set of scan entries; and wherein computing the plurality of capture masks further comprises for each of the sequence of sub-intervals:

identifying a subset of scan entries of the set of scan entries associated with the sub-interval according to the temporal distribution of the capture interval;

dividing the subset of scan entries into a plurality of further subsets of scan entries according to a spatial distribution of the subset of scan entries; and computing each of the plurality of capture masks for one of the plurality of further subsets of scan entries according to the scanning pattern, the sampling time associated with the sub-interval and the further subset of scan entries.

11. The system of claim 10, wherein the at least one processing circuitry is further adapted for:

computing a plurality of camera tasks, each having a field-of-view (FoV) computed for one of the further subsets of scan entries such that a camera having the FoV and operated in the environment captures a subset of captured data points of the plurality of captured data points according to the further subset of scan entries;

associating each of the plurality of camera tasks with a simulation time according to the sampling time associated with the respective further subset of scan entries used to compute the camera task; and generating the sequence of partial simulation images using a simulation generator according to the plurality of camera tasks.

12. The system of claim 11, further comprising at least one graphical processing unit connected to the at least one processing circuitry;

wherein at least one of the sequence of partial simulation images is generated by providing to the at least one graphical processing unit the FoV of one of the plurality of camera tasks and simulation data describing the simulated environment.

13. A system for generating synthetic data, comprising at least one graphical processing unit connected to at least one processing circuitry;

wherein the at least one processing circuitry is adapted for:

computing a sequence of partial simulation images, where each of the sequence of partial simulation images is associated with an estimated simulation time and with part of a simulated environment at the respective estimated simulation time thereof;

computing at least one simulated sensor point-cloud, each simulated sensor point-cloud simulating a sensor point-cloud captured in a capture interval by a sensor operated in a scanning pattern from an environment equivalent to a simulated environment, where the scanning pattern describes a temporal distribution in the capture interval of a plurality of captured data points of the sensor point-cloud, by applying to each partial simulation image of the sequence of partial simulation images a capture mask computed according to the scanning pattern and a relation between the capture interval and an estimated simulation time associated with the partial simulation image; and providing the at least one simulated sensor point-cloud to at least one training engine to train a perception system comprising the sensor, wherein computing the at least one simulated sensor point-cloud comprises computing a plurality of capture masks, one for each estimated simulation time of one of the sequence of partial simulation images, and computed according to the scanning pattern and a relation between the capture interval and the respective estimated simulation time;

wherein the at least one processing circuitry is further adapted for:

dividing the capture interval into a sequence of sub-intervals; and associating a sampling time with each of the sequence of sub-intervals, computed according to a relation between the capture interval and the sub-interval;

wherein each estimated simulation time of one of the sequence of partial simulation images is a sampling time associated with one of the sequence of sub-intervals;

wherein the scanning pattern comprises a set of scan entries; and wherein computing the plurality of capture masks further comprises for each of the sequence of sub-intervals:

identifying a subset of scan entries of the set of scan entries associated with the sub-interval according to the temporal distribution of the capture interval;

dividing the subset of scan entries into a plurality of further subsets of scan entries according to a spatial distribution of the subset of scan entries; and computing each of the plurality of capture masks for one of the plurality of further subsets of scan entries according to the scanning pattern, the sampling time associated with the sub-interval and the further subset of scan entries, wherein the at least one processing circuitry is further adapted for:

computing a plurality of camera tasks, each having a field-of-view (FoV) computed for one of the further subsets of scan entries such that a camera having the FoV and operated in the environment captures a subset of captured data points of the plurality of captured data points according to the further subset of scan entries;

associating each of the plurality of camera tasks with a simulation time according to the sampling time associated with the respective further subset of scan entries used to compute the camera task; and generating the sequence of partial simulation images using a simulation generator according to the plurality of camera tasks;

wherein at least one of the sequence of partial simulation images is generated by providing to the at least one graphical processing unit the FoV of one of the plurality of camera tasks and simulation data describing the simulated environment wherein computing the plurality of capture masks further comprises one or more of:

deleting from the plurality of further subsets of scan entries at least one empty subset of scan entries; and moving at least one scan entry from one of the further subsets of scan entries to another subset of scan entries according to at least one balancing criterion.

14. The system of claim 13, wherein the sequence of partial simulation images is computed using a sequence of simulation images generated by a simulation generator, where each simulation image of the sequence of simulation images describes a ground truth of the simulated environment at the respective simulation time thereof;

wherein each of the sequence of simulation images comprises a plurality of simulated pixels;

wherein each of the plurality of simulated pixels comprises at least one simulation value selected from the group of simulation values of: a depth, an object instance identification value, an object class value, a distance, an angle, a material identification value, an angle, an intensity, a color identification value, a beam width, a percent of a beam, a multi-path return count value, a velocity value, a scan pattern point index, a fill factor, a structure identification value, and a simulated return value; and wherein for each partial simulation image of the sequence of partial simulation images:

the estimated simulation time associated therewith is between two respective simulation times of two simulation images of the sequence of simulation images; and the partial simulation image is computed by combining two point of view transformations of the two simulation images.

15. The system of claim 14, wherein computing the sequence of partial simulation images comprises for each two consecutive simulation images of the sequence of simulation images having a first simulation image and a second simulation image:

identifying a sequence of sampling times in a simulation interval between a first simulation time of the first simulation image and a second simulation time of the second simulation image such that each of the sequence of sampling times is equal to or later than the first simulation time and is equal to or earlier than the second simulation time; and for each sampling time of the sequence of sampling times:

computing a first projection of the first simulation image according to a respective expected point of view of the sensor in the simulation at the sampling time;

computing a second projection of the second simulation image according to the expected point of view of the sensor in the simulation at the sampling time; and combining the first projection and the second projection to produce one partial simulation image of the sequence of partial simulation images, where the estimated simulation time thereof is the sampling time.

16. The system of claim 15, wherein computing the at least one simulated sensor point-cloud comprises computing a plurality of capture masks, one for each estimated simulation time of one of the sequence of partial simulation images; and wherein each estimated simulation time of one of the sequence of partial simulation-images is a sampling time of the sequence of sampling times.

17. The system of claim 14, further comprising at least one graphical processing unit connected to the at least one processing circuitry;

wherein the two point of view transformations are computed, where computing the two point of view transformations comprises providing each of the two simulation images to the at least one graphical processing unit.

18. A method for generating synthetic data, comprising:

computing a sequence of partial simulation images, where each of the sequence of partial simulation images is associated with an estimated simulation time and with part of a simulated environment at the respective estimated simulation time thereof;

computing at least one simulated point-cloud, each simulated point-cloud simulating a point-cloud captured in a capture interval by a sensor operated in a scanning pattern from an environment equivalent to a simulated environment, where the scanning pattern describes a temporal distribution in the capture interval of a plurality of captured data points of the point-cloud, by applying to each partial simulation image of the sequence of partial simulation images a capture mask computed according to the scanning pattern and a relation between the capture interval and an estimated simulation time associated with the partial simulation image; and providing the at least one simulated point-cloud to at least one training engine to train a perception system comprising the sensor;

wherein the sequence of partial simulation images is computed using a sequence of simulation images generated by a simulation generator, where each simulation image of the sequence of simulation images describes a ground truth of the simulated environment at the respective simulation time thereof;

wherein each of the sequence of simulation images comprises a plurality of simulated pixels;

wherein each of the plurality of simulated pixels comprises at least one simulation value selected from the group of simulation values of: a depth, an object instance identification value, an object class value, a distance, an angle, a material identification value, an angle, an intensity, a color identification value, a beam width, a percent of a beam, a multi-path return count value, a velocity value, a scan pattern point index, a fill factor, a structure identification value, and a simulated return value; and wherein for each partial simulation image of the sequence of partial simulation images:

the estimated simulation time associated therewith is between two respective simulation times of two simulation images of the sequence of simulation images; and the partial simulation image is computed by combining two point of view transformations of the two simulation images;

wherein computing the sequence of partial simulation images comprises for each two consecutive simulation images of the sequence of simulation images having a first simulation image and a second simulation image;

identifying a sequence of sampling times in a simulation interval between a first simulation time of the first simulation image and a second simulation time of the second simulation image such that each of the sequence of sampling times is equal to or later than the first simulation time and is equal to or earlier than the second simulation time; and for each sampling time of the sequence of sampling times:

computing a first projection of the first simulation image according to a respective expected point of view of the sensor in the simulation at the sampling time;

computing a second projection of the second simulation image according to the expected point of view of the sensor in the simulation at the sampling time; and combining the first projection and the second projection to produce one partial simulation image of the sequence of partial simulation images, where the estimated simulation time thereof is the sampling time;

wherein each of the first projection and the second projection comprises a plurality of projected pixels; and wherein combining the first projection and the second projection comprises:

identifying a minimum time difference from a first time difference between the first simulation time and the sampling time and a second time difference between the second simulation time and the sampling time, where the first time difference is associated with the first projection and the second time difference is associated with the second projection;

selecting one of the first projection and the second projection as a primary projection according to the minimum time difference associated therewith;

selecting one of the first projection and the second projection that is not the primary projection as a secondary projection;

identifying in the primary projection at least one blank projected pixel; and updating the at least one blank projected pixel in the primary projection according to an equivalent projected pixel in the secondary projection.

\* \* \* \* \*